United States Patent

Wakiwaka et al.

Patent Number: 5,909,068
Date of Patent: Jun. 1, 1999

[54] VIBRATION GENERATING DEVICE

[75] Inventors: Hiroyuki Wakiwaka; Hisashi Yajima, both of Nagano-ken; Katsuhiko Haruyama, Tokyo, all of Japan

[73] Assignee: Teikoku Tsushin Kogyo Co., Ltd., Kanagawa-ken, Japan

[21] Appl. No.: 08/997,163

[22] Filed: Dec. 23, 1997

[30] Foreign Application Priority Data

Dec. 26, 1996 [JP] Japan .................................. 8-357337

[51] Int. Cl.⁶ .................................................. H02K 33/00
[52] U.S. Cl. .................................. 310/15; 310/25; 310/32
[58] Field of Search ................................ 310/15, 25, 29, 310/32

[56] References Cited

U.S. PATENT DOCUMENTS

| | | | |
|---|---|---|---|
| 1,821,181 | 1/1931 | Gunn | 310/25 |
| 3,064,096 | 11/1962 | Bosch | 310/25 |
| 3,559,100 | 1/1971 | Grib et al. | 310/25 |
| 3,581,129 | 5/1971 | Ganter | 310/25 |
| 4,170,783 | 10/1979 | Tajima | 358/128 |
| 5,263,218 | 11/1993 | Giuliani et al. | 310/29 |

FOREIGN PATENT DOCUMENTS

| | | | |
|---|---|---|---|
| 918358 | 4/1945 | France | 310/25 |
| 838019 | 6/1949 | Germany | 310/25 |
| 5-60158 | 5/1993 | Japan . | |

Primary Examiner—Nestor Ramirez
Assistant Examiner—Joseph Waks
Attorney, Agent, or Firm—Stephen C. Glazier

[57] ABSTRACT

A small-size, thin-profile vibration generating device capable of functioning with improved durability and reliability and with less consumption of power includes a yoke constituting an electromagnet on which a coil has been wound, and a movable element having permanent magnets. The movable element is disposed in a gap, which is provided in the closed magnetic circuit of the yoke, in such a manner that both end faces of the movable element form prescribed gaps with end faces of the yoke. The movable end of a leaf spring is attached to the movable element. The other, fixed end of the leaf spring is attached to the center of the yoke. When the movable element vibrates in the gap, magnetic poles at the end faces of the yoke approached by the end faces of the movable element are magnetically energized by flow of a current in order to be made identical with magnetic poles at the end faces of the movable element, thereby repelling the movable element. The result is that vibration is produced at a prescribed oscillation frequency.

1 Claim, 4 Drawing Sheets

VIBRATION GENERATING DEVICE

BACKGROUND OF THE INVENTION

This invention relates to a vibration generating device.

A portable device such as a portable telephone which functions as the terminal of a mobile communications device can be made to notify the user of an incoming call by emitting a ringing tone. An alternative, however, is to house a vibrator within the portable device itself or within an accessory thereof and cause the vibrator to vibrate so as to make the user sense the incoming call physically.

A vibration generating device of this kind according to the prior art is as shown in FIG. 4. The device includes a small pencil-shaped motor 80 having a rotary shaft 81 to which a weight 83 is eccentrically attached. Rotating the weight 83 causes the device to vibrate.

A vibration generating device having components mounted more densely than in the device described above is illustrated in FIG. 5. This device includes a permanent magnet 91 arranged in the form of a ring, three coils 97 freely rotatably mounted on a shaft 93 above the permanent magnet 91, and a weight 98 eccentrically attached to the coils 97. Rotating the coils 97 causes the device to vibrate.

In both of the vibration generating devices described above, the method of generating vibration relies upon resonance of the case produced by transmitting to the case the vibration of the rotating shaft caused by the eccentric vibration of a motor. As a consequence, the bearing portion of the motor shaft is acted upon by an excessively large force, which gives rise to problems in terms of the durability and reliability of the vibration generating device.

Since the motor must rotate constantly while vibration is being produced, a current must be passed through the motor during vibration. The result is increased consumption of the battery serving as the power supply of the vibration generating device.

Further, the smaller the motor is made, the less vibrational energy produced. This makes it necessary to enlarge the current flow. This, however, is accompanied by the evolution of heat.

SUMMARY OF THE INVENTION

Accordingly, an object of the present invention is to provide a small-size, slender vibration generating device capable of functioning with improved durability and reliability and with less consumption of power.

According to the present invention, the foregoing object is attained by providing a vibration generating device which relies upon the simple harmonic motion of a movable element fixed to the free end (movable end) of a spring.

More specifically, the foregoing object is attained by providing a vibration generating device which comprises a yoke constituting an electromagnet on which a coil has been wound and defining a closed magnetic circuit provided with gap, a movable element having permanent magnets and disposed in the gap in such a manner that end faces of the movable element form prescribed gaps with end faces of the yoke, and a spring attached to the movable element for resiliently biasing the end faces of the movable element toward and away from the end faces of the yoke, wherein magnetic poles at the end faces of the yoke approached by the end faces of the movable element owing to vibration of the movable element are made identical with magnetic poles at the end faces of the movable element to thereby repel the movable element, whereby vibration is produced at a prescribed oscillation frequency.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of a vibration generating device according to the present invention will now be described with reference to FIGS. 1 through 3.

(First Embodiment)

Figure 1:
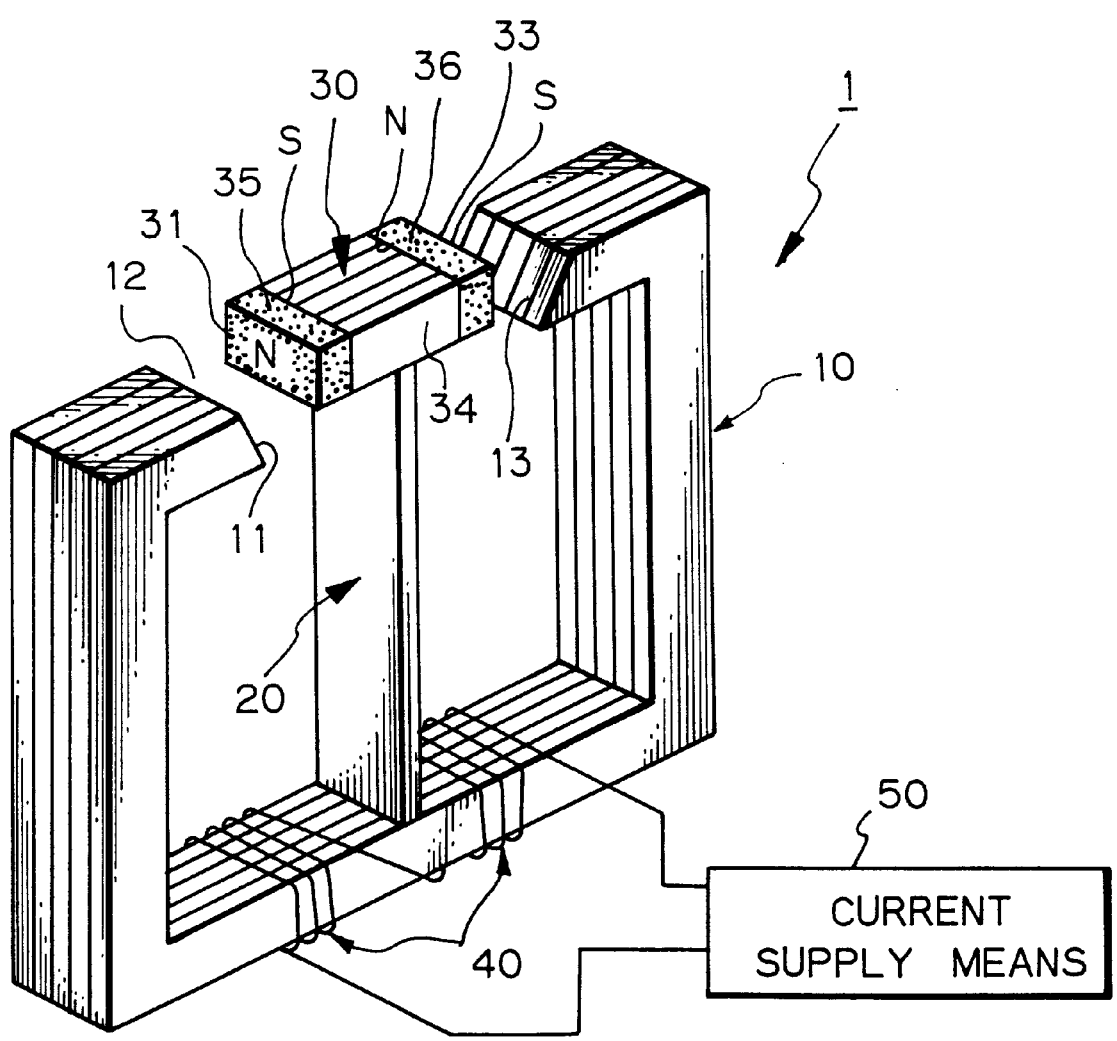
FIG. 1 is a perspective view showing a vibration generating device according to a first embodiment of the present invention.

FIG. 1 is a perspective view showing a vibration generating device 1 according to a first embodiment of the present invention. The vibration generating device 1 comprises a yoke 10 having a generally C-shaped configuration, a leaf spring 20 having a lower end fixed to substantially the central portion of the yoke 10, and a movable element 30 fixed to the upper or movable end of the leaf spring 20.

The yoke 10 consists of a soft magnetic body such as pure iron and has a coil 40 wound upon one side at the center thereof to thereby construct an electromagnet. Both ends of the yoke 10 define end faces 11 and 13 projecting inwardly toward each other.

The electromagnet constructed by the yoke 10 and coil 40 has a generally quadrangular closed magnetic circuit. A gap 12 in which the movable element 30 is disposed is formed between the end faces 11 and 13.

Both ends of the coil 40 are connected to current supply means 50.

The leaf spring 20 is fabricated from a material such as phosphor bronze. The lower end of the leaf spring 20 is fixed to the yoke 10 by means such as screws, not shown.

The movable element 30 is formed by two permanent magnets 35, 36 and a movable yoke 34 made of a material the same as that of the yoke 10. The movable element 30 has end faces 31 and 33 constituted by N and S magnetic poles, respectively. The movable upper end of the leaf spring 20 is fixed to the lower side of the movable element 30 at the central portion thereof. Thus, the end faces 31 and 33 of the movable element 30 are spaced identical distances away from the end faces 11 and 13, respectively, of the yoke 10.

The leaf spring 20 is designed to have a resilient restoration force such that the end face 31 or 33 of the movable element 30 constituted by the permanent magnets will be attracted by and deflected toward the end face 11 or 13 of the yoke 10 by magnetic force in the absence of a flow of current into the coil 40.

When a prescribed current is passed into the coil 40 by the current supply means 50, simple harmonic motion of the movable element 30 starts in the transverse direction. The principle of this operation will now be described.

When a current is not flowing into the coil 40, the force of attraction between the end faces 31, 33 of the movable element 30 and the end faces 11, 13 of the yoke 10 is greater than the resilient restoration force of the leaf spring 20. As a result, the movable element 30 is deflected in either direction and comes to rest with, say, the end faces 11 and 31 in a state of attraction.

Next, when a current is fed into the coil 40 from the current supply means 50, the end face 11 of the yoke 10 is magnetically excited into an N pole and the end face 13 into an S pole. When this occurs, the end faces 11 and 31 that were heretofore in a state of attraction are caused to repel each other since both are now N magnetic poles. The movable element 30, therefore, is deflected toward the opposite side of the yoke 10 by this force of repulsion and the resilient restoration force of the leaf spring 20.

Next, the end face 33 of the movable element 30 on the opposite side thereof approaches the end face 13 of the yoke 10 owing to the deflection of the movable element 30. However, since both end faces 13, 33 are identical S magnetic poles, these poles repel each other again, thereby deflecting the movable element 30 back in the other direction.

Since the above-described operation is repeated, the movable element 30 is repeatedly deflected (vibrated) back and forth between the end faces 11, 13 of the yoke 10 in continuous fashion.

If the flow of current is cut off, the movable element 30 is attracted toward either the end face 11 or 13 of the yoke and vibration ceases.

Figure 3:
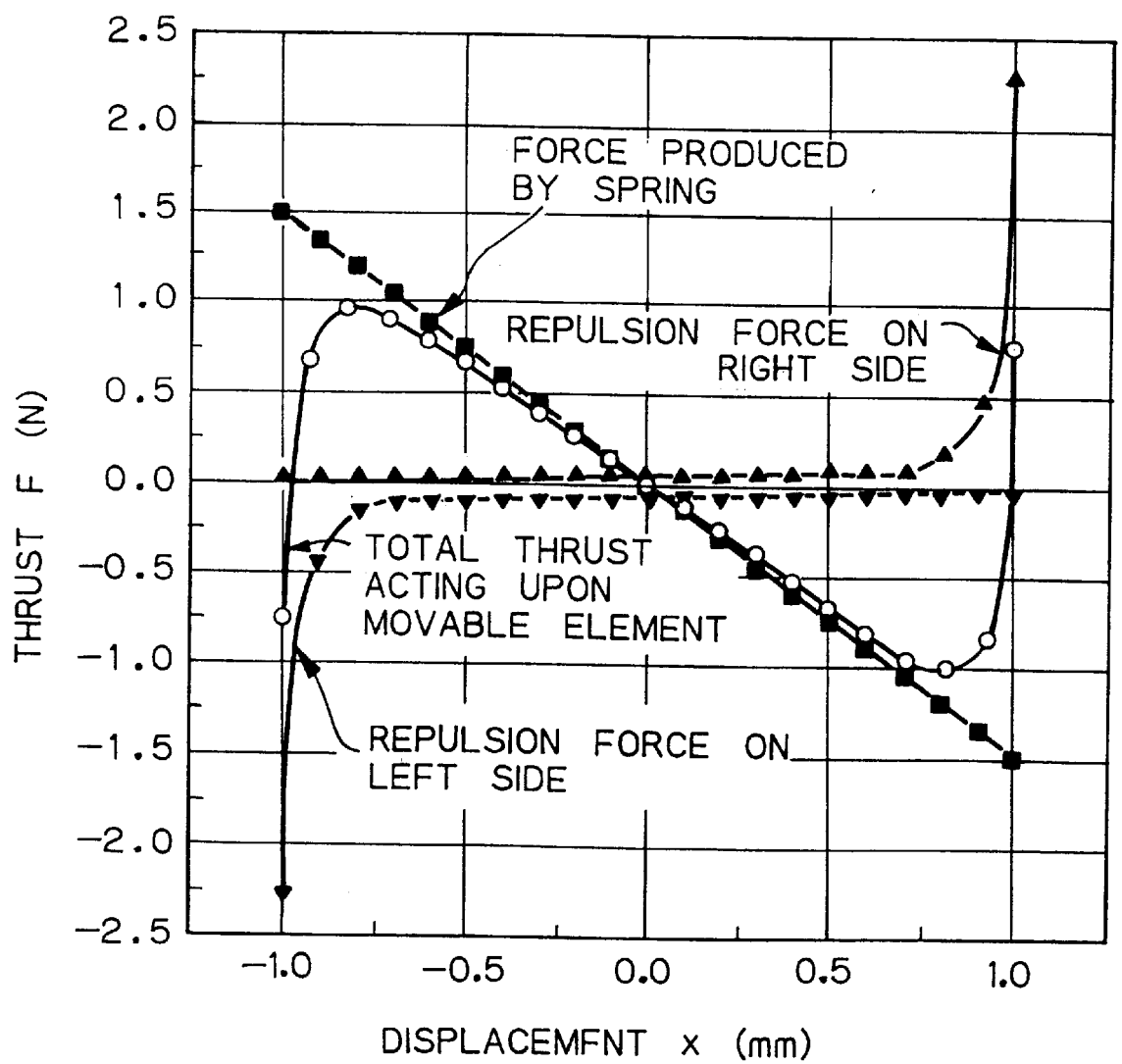
FIG. 3 is a graph showing the relationship between transverse displacement of a movable element and force (thrust) acting upon the movable element.
Figure 4:
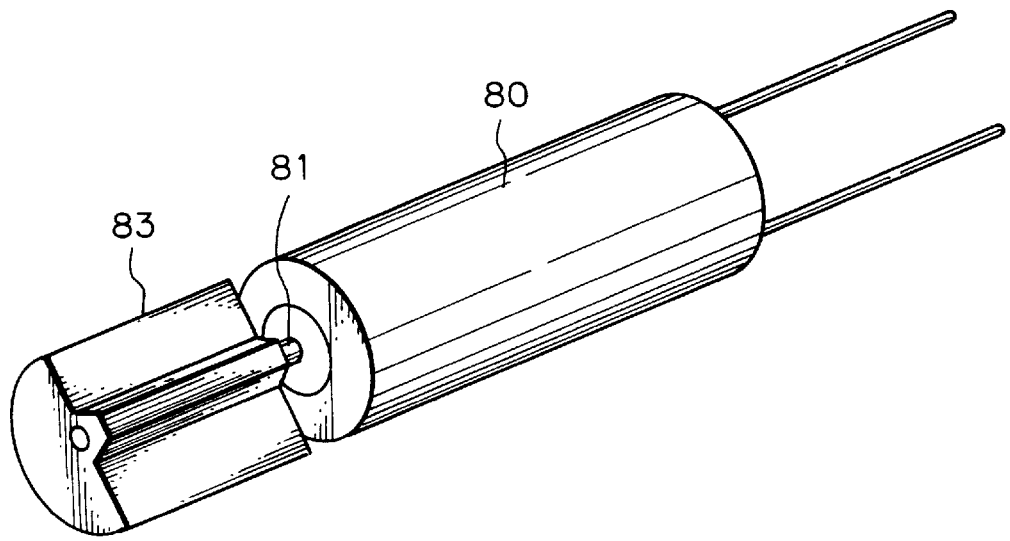
FIG. 4 is perspective view showing a vibration generating device according to the prior art.
Figure 5A:
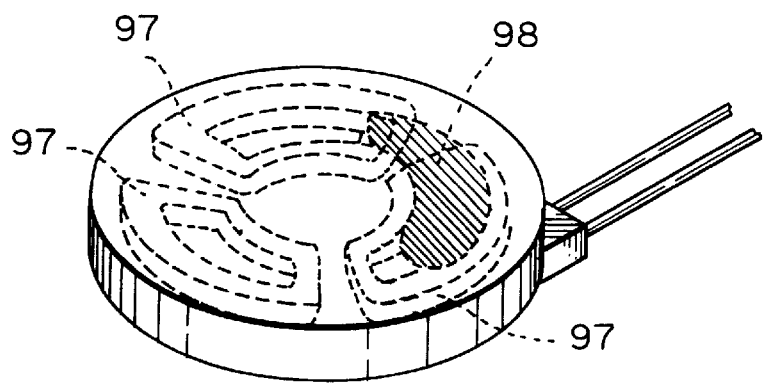
FIGS. 5A and 5B are perspective and sectional views, respectively, of another example of a vibration generating device according to the prior art.
Figure 5B:
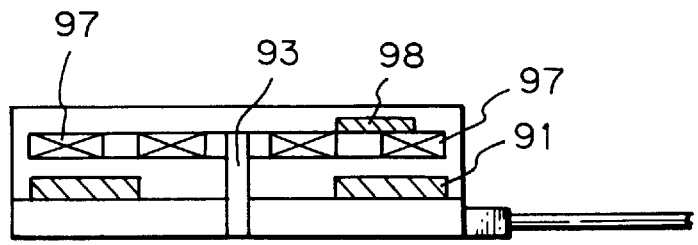

FIG. 3 is a diagram showing the relationship between transverse displacement×[mm] of a movable element and force (thrust) F [N] acting upon the movable element 30. The gaps between the end faces 31, 33 of the movable element 30 and the end faces 11, 13 of the yoke 10 are each 1 mm.

The black squares in FIG. 3 indicate the resilient restoration force which the leaf spring 20 applies to the movable element 30. It will be appreciated that the thrust produced by this force is proportional to displacement (Hooke's law).

The black triangles in FIG. 3 indicate the attraction force between the end faces 31, 33 of the movable element 30 and the end faces 11, 13 of the yoke 10 when the coil 40 is not being excited. This curve shows that when the movable element 30 approaches the yoke 10, the attraction force between the end faces that are close together increases sharply (in inverse proportion to the square of the distance between the end faces).

The white circles indicate the total of the resilient restoration force and attraction force, namely the total force that acts upon the movable element 30.

It will be understood from FIG. 3 that when the coil 40 is not being magnetically excited and, hence, there is a state of attraction between the end faces 31 and 11 or between the end faces 33 and 13, the attraction force between the movable element 30 and the yoke 10 is stronger than the resilient restoration force of the leaf spring 20, as a result of which the movable element 30 and yoke 10 are maintained in the state of attraction. This force of attraction is indicated at the left and right ends of the curve of white circles and has a value on the order of 0.75N.

If the coil 40 provides enough excitation to overcome this attraction force of 0.75N, vibration starts in the manner set forth above.

Though the attraction force indicated by the black triangles increases sharply when the end faces 11, 31 or end faces 13, 33 are in close proximity to each other, the attraction force is weak at all other times. This means that it is unnecessary to constantly supply the coil 40 with current; it will suffice if the device is so designed that the current is supplied only when the end faces 11, 31 or end faces 13, 33 have come into close proximity with each other. In other words, the current supplied by the current supply means 50 should be pulsed. If such an arrangement is adopted, more power can be conserved and the vibration of the movable element 30 will not attenuate.

The movable element 30 has an oscillation frequency f uniquely decided by the spring constant of the leaf spring 20 and the mass m of the movable element 30. Accordingly, the frequency of the pulsed current that flows into the coil 40 should be made twice the oscillation frequency of the movable element 30 (in view of the fact that the movable element 30 approaches both end faces of the yoke, i.e. the one end face 11 and the other end face 13).

It should be noted that the desired oscillation frequency f may be obtained by selecting the length and thickness of the leaf spring 20 even if the mass of the movable element 30 has already been decided. Conversely, the desired oscillation frequency f may be obtained by selecting the mass of the movable element 30 and the thickness of the leaf spring 20 even if the length of the leaf spring 20 has already been decided. Thus, there is a great deal of freedom in terms of designing a vibration generating device that is small and thin.

Thus, in accordance with the present invention as described above, energy is supplied by displacing the leaf spring 20 by the force that magnetically attracts the movable element 30 to the yoke 10. The magnetic attraction force is then canceled by causing the end face 11 or 13 of the yoke 11 that attracted the movable element 30 to exhibit magnetism identical with that of the magnetically attracted movable element 30. As a result, vibration starts to be produced by the resilient restoration force of the leaf spring 20 and the yoke 10 is repelled by the excited magnetic field on the opposite side as well. The vibration is thus caused to continue. In other words, the fundamental vibrational energy is simple harmonic motion produced by the initial displacement of the leaf spring 20, and the supplied current assists the continuation of this simple harmonic motion (i.e. the current supplied is that needed to overcome the magnetic attraction between the yoke 10 and the movable element 30). This means that the power consumed can be made exceedingly small. It goes without saying that further conservation of power is achieved if the current is supplied in the form of pulses, as mentioned above.

(Second Embodiment)

Figure 2:
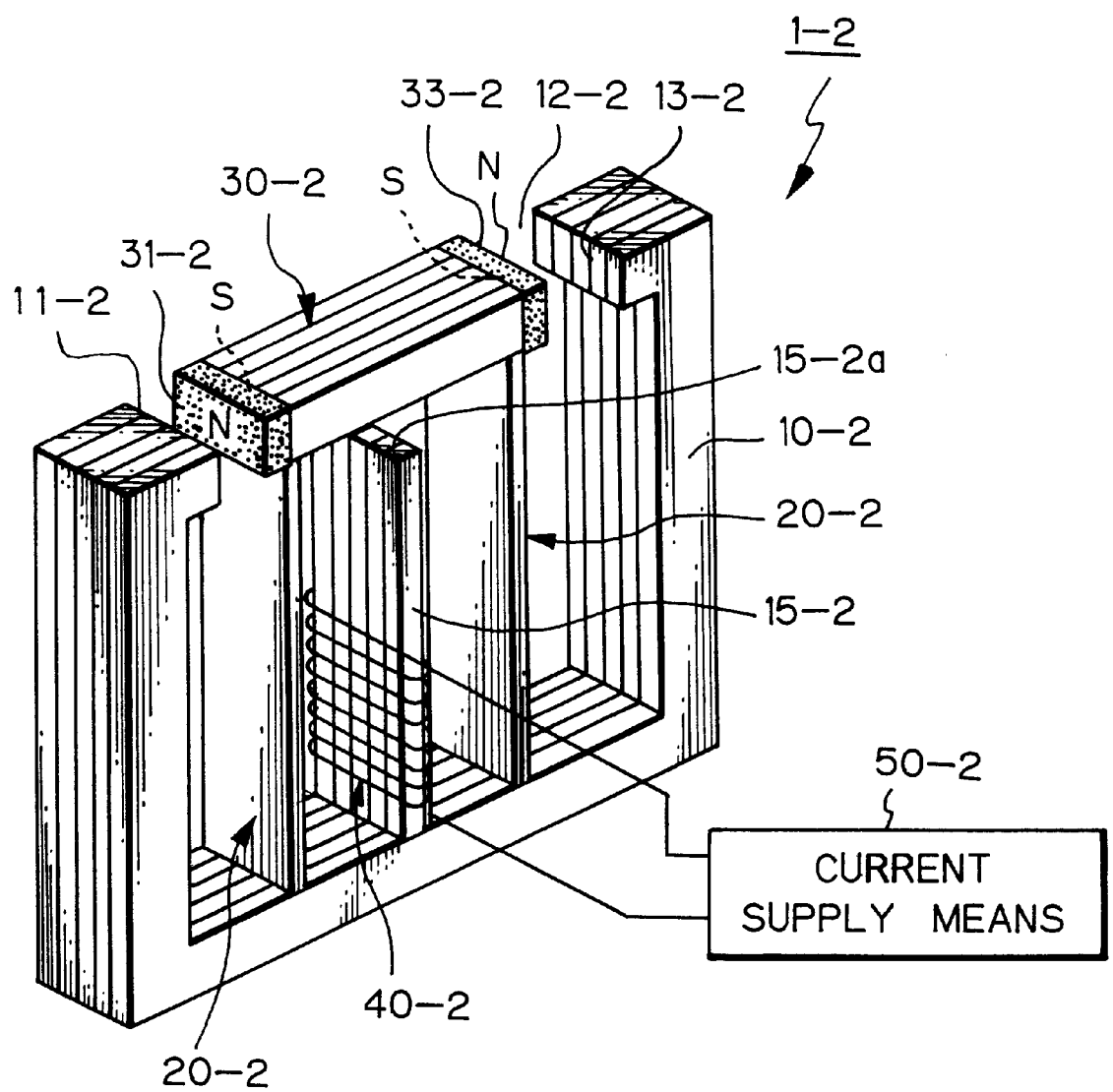
FIG. 2 is a perspective view showing a vibration generating device according to a second embodiment of the present invention.

FIG. 2 is a perspective vies showing a vibration generating device 1-2 according to a second embodiment of the present invention.

The vibration generating device 1-2 according to this embodiment comprises a yoke 10-2 having a generally E-shaped configuration with a central yoke portion 15-2 projecting from the center of the yoke 10-2, a pair of leaf springs 20-2 having their lower ends fixed to portions of the yoke 10-2 on either side of the central yoke portion 15-2 in such a manner that the leaf springs 20-2 lie parallel to the central yoke portion 15-2, and a movable element 30-2 fixed to the upper or movable ends of both leaf springs 20-2.

A coil 40-2 is wound upon the central yoke portion 15-2. The two ends of the yoke 10-2 project inwardly toward each other and have opposing end faces 11-2, 13-2 between which a gap 12-2 of a closed magnetic circuit is provided.

The movable element 30-2 is constructed by attaching permanent magnets to both sides of a soft magnetic body such as pure iron. The permanent magnets are attached in such a manner that their S poles are directed inward while their N poles are directed outward.

A gap is provided between the movable element 30-2 and a pole end face 15-2a located on the free end of the central yoke portion 15-2.

When a current is not flowing into the coil 40-2, the attraction force between both end faces 31-2, 33-2 of the movable element 30-2 and both end faces 11-2, 13-2 of the yoke 10-2 is greater than the resilient restoration force of the leaf springs 20-2. As a result, the movable element 30-2 is deflected in either direction and comes to rest with any two opposing end faces, e.g. the end faces 11-2, 31-2, in a state of attraction.

Next, when a current is fed into the coil 40-2 from the current supply means 50-2, the end face 11-2 of the yoke 10-2 is magnetically excited into an N pole (at which time the other end face 13-2 becomes an N pole and the end face 15-2a becomes an S pole). When this occurs, both end faces 11-2, 31-2 that were heretofore in a state of attraction are caused to repel each other. The movable element 30-2, therefore, is deflected toward the opposite side of the yoke 10-2 by this force of repulsion and the resilient restoration force of the leaf springs 20-2.

Next, the end face 33-2 of the movable element 30-2 on the opposite thereof approaches the end face 13-2 of the yoke 10 owing to the deflection of the movable element 30-2. However, since both end faces 13-2, 33-2 are identical N magnetic poles, these poles repel each other again.

Since the above-described operation is repeated, the movable element 30-2 is repeatedly vibrated between the end faces 11-2, 13-2 of the yoke 10-2 in continuous fashion.

If the flow of current is cut off, the movable element 30-2 is attracted toward either the end face 11-2 or 13-2 of the yoke and vibration ceases.

Since the movable element 30-2 according to this embodiment is fixed to the pair of parallel leaf springs 20-2, 20-2, the two leaf springs will vibrate in parallel. As a result, the gap between the end face 15-2a and the movable element 30-2 can be held substantially constant. Even when the movable element 30-2 is displaced, therefore, the lower side of the soft magnetic portion of the movable element 30-2 constantly opposes the end face 15-2a, thereby assuring that the magnetic circuit will not be disturbed. This in turn assures stable vibration.

Though leaf springs are used as the springs in each of the foregoing embodiments, it goes without saying that rod-shaped springs may be used.

Further, the vibration generator according to the present invention is not limited to use in a portable device but is applicable to any device in which it is desired to produce vibration.

The present invention provides a number of advantages. First, the device has a simple structure and can be made small in size and thickness. Second, since is suffices to continue the simple harmonic motion of a spring, excessive forces are not applied, unlike the conventional device which relies upon the eccentric rotation of a motor. The result is improved durability and greater reliability. Third, the fundamental vibrational energy is simple harmonic motion produced from initial displacement of the spring, and the supplied current assists the continuation of this simple harmonic motion. As a result, the power consumed can be made exceedingly small. More power can be conserved if the supplied current is pulsed. Fourth, the oscillation frequency is decided by the spring constant and the mass of the movable element. This obviates a phenomenon in which the oscillation frequency varies depending upon the input current, as occurs in the case of a motor. This makes it possible to obtain the oscillation frequency sought.

As many apparently widely different embodiments of the present invention can be made without departing from the spirit and scope thereof, it is to be understood that the invention is not limited to the specific embodiments thereof except as defined in the appended claims.

What is claimed is:

1. A vibration generating device comprising:

a yoke constituting an electromagnet on which a coil has been wound and defining a closed magnetic circuit provided with a gap;

a movable element having permanent magnets and being disposed in the gap in such a manner that end faces of said movable element form prescribed gaps with end faces of said yoke; and a spring attached to said movable element for resiliently biasing the end faces of said movable element toward and away from the end faces of said yoke;

wherein when said movable element vibrates in the gap, magnetic poles at the end faces of said yoke approached by the end faces of said movable element are made identical with magnetic poles at the end faces of said movable element to thereby repel said movable element, whereby a vibration is produced at a prescribed oscillation frequency, wherein said yoke has a generally E-shaped configuration with a central yoke portion projecting from a center of said yoke, wherein said spring comprises a pair of leaf-shaped or rod-shaped springs each having one end thereof fixed to portions of said yoke on either side of the central yoke portion in such a manner that said springs lie parallel to said central yoke portion, said movable element is secured to movable ends of the pair of springs, and said prescribed gap is provided between said movable element and a magnetic pole at the end face of said central yoke portion;

said movable element being constructed by attaching said permanent magnets to both ends of a magnetic body in such a manner that identical magnetic poles are directed outwardly thereof.

* * * * *

UNITED STATES PATENT AND TRADEMARK OFFICE
CERTIFICATE OF CORRECTION

PATENT NO. : 5,909,068
DATED : June 1, 1999
INVENTOR(S) : Wakiwaka, et al

It is certified that error appears in the above-identified patent and that said Letters Patent is hereby corrected as shown below:

On the title page, item [75] Inventors: insert the following inventor:
-- Haruo Itoh, Kanagawa-ken, Japan --

Signed and Sealed this

Seventh Day of December, 1999

Attest:

Q. TODD DICKINSON

*Attesting Officer*     *Acting Commissioner of Patents and Trademarks*